(12) United States Patent
Nahrwold et al.

(10) Patent No.: US 11,168,792 B2
(45) Date of Patent: *Nov. 9, 2021

(54) SEAL ARRANGEMENT

(71) Applicant: Carl Freudenberg KG, Weinheim (DE)

(72) Inventors: Olaf Nahrwold, Ludwigshafen (DE); Stefan Sindlinger, Weinheim (DE); Boris Traber, Hirschberg (DE); Sascha Moeller, Buerstadt (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/767,124

(22) PCT Filed: Aug. 13, 2018

(86) PCT No.: PCT/EP2018/071914
§ 371 (c)(1),
(2) Date: May 27, 2020

(87) PCT Pub. No.: WO2019/105605
PCT Pub. Date: Jun. 6, 2019

(65) Prior Publication Data
US 2020/0370655 A1 Nov. 26, 2020

(30) Foreign Application Priority Data

Nov. 28, 2017 (DE) ...................... 10 2017 010 981.8
Mar. 5, 2018 (DE) ...................... 10 2018 001 690.1

(51) Int. Cl.
*F16J 15/3296* (2016.01)
*F16J 15/06* (2006.01)
(Continued)

(52) U.S. Cl.
CPC ......... *F16J 15/3296* (2013.01); *F16J 15/064* (2013.01); *F16J 15/3284* (2013.01); *F16J 15/44* (2013.01)

(58) Field of Classification Search
CPC .. F16J 15/064; F16J 15/16; F16J 15/32; F16J 15/3248; F16J 15/3268; F16J 15/3276; F16J 15/3284; F16J 15/3296; F16J 15/44
See application file for complete search history.

(56) References Cited

U.S. PATENT DOCUMENTS 5,581,019 A 12/1996 Minor et al.
5,826,883 A * 10/1998 Cho ...................... F16J 15/126
277/410

(Continued)

FOREIGN PATENT DOCUMENTS

DE 102007007405 A1 8/2008
DE 102007007405 B4 5/2011
(Continued)

OTHER PUBLICATIONS

U.S. Appl. No. 16/766,753, filed May 26, 2020.

*Primary Examiner* — Gilbert Y Lee
(74) *Attorney, Agent, or Firm* — Leydig, Voit & Mayer Ltd.

(57) ABSTRACT

A sealing arrangement for sealing a gap between a machine element and a housing includes: at least one sealing element; and an insulation which electrically insulates the at least one sealing element from the machine element and the housing. The at least one sealing element is at least partially electrically conductive.

12 Claims, 7 Drawing Sheets

(51) Int. Cl.
  *F16J 15/3284* (2016.01)
  *F16J 15/44* (2006.01)

(56) References Cited

U.S. PATENT DOCUMENTS

| | | |
|---|---|---|
| 6,003,872 A | 12/1999 | Juergen |
| 6,543,785 B1 * | 4/2003 | Katayama ............. F16J 15/102 |
| | | 277/534 |
| 6,615,639 B1 | 9/2003 | Heinzen |
| 2012/0119148 A1 | 5/2012 | Miyagawa |
| 2012/0119448 A1 | 5/2012 | Stewart et al. |
| 2017/0009550 A1 | 1/2017 | Leuchtenberg |
| 2017/0172018 A1 | 6/2017 | Dilmaghanian |
| 2018/0112779 A1 | 4/2018 | Nahrwold |
| 2019/0072183 A1 * | 3/2019 | Nahrwold ............ F16J 15/3296 |

FOREIGN PATENT DOCUMENTS

| | | | |
|---|---|---|---|
| DE | 102016012552 A1 | 4/2018 | |
| EP | 3312480 A1 | 4/2018 | |
| GB | 2401409 A | 11/2004 | |
| JP | 61136061 A * | 6/1986 | ............... F16J 15/32 |
| JP | 2015135156 A | 7/2015 | |
| SU | 389335 A1 | 7/1973 | |

* cited by examiner

SEAL ARRANGEMENT

CROSS-REFERENCE TO PRIOR APPLICATIONS

This application is a U.S. National Phase application under 35 U.S.C. § 371 of International Application No. PCT/EP2018/071914, filed on Aug. 13, 2018, and claims benefit to German Patent Application No. DE 10 2018 001 690.1, filed on Mar. 5, 2018 and German Patent Application No. DE 10 2017 010 981.8, filed on Nov. 28, 2017. The International Application was published in German on Jun. 6, 2019 as WO 2019/105605 under PCT Article 21(2).

FIELD

The invention relates to a sealing arrangement for sealing a gap between a machine element and a housing, comprising at least one sealing element.

BACKGROUND

Seals, in particular dynamically stressed seals, wear during the intended service life, wherein various wear phenomena have an effect. As a result of material fatigue, the contact stress of the seal diminishes; the contact pressure also decreases. The dimensions of the seal change due to wear and setting behavior. These processes initially result in leakage and subsequently in failure of the sealing system. However, statically stressed seals also wear during the intended service life. The setting behavior is particularly important here.

For leakage monitoring of seals, it is known to integrate a device for leakage monitoring into the seal. DE 10 2007 007 405 B4 discloses an electrical device for detecting the state of wear of a dynamic sealing element. The sealing element comprises an electrically conductive section and an electrically non-conductive section which is in contact with the machine element to be sealed. The machine element is also electrically conductive. The electrically non-conductive sealing material is worn away through wear of the sealing element so that the electrically conductive sealing material comes into contact with the machine element. This results in the closing of a circuit and it can be determined that the sealing element is worn out.

In this embodiment, it is disadvantageous that no gradual changes in state can be detected. It can only be determined that the wear limit has been reached and that the sealing element has to be replaced.

SUMMARY

In an embodiment, the present invention provides a sealing arrangement for sealing a gap between a machine element and a housing, comprising: at least one sealing element; and an insulation which electrically insulates the at least one sealing element from the machine element and the housing, wherein the at least one sealing element is at least partially electrically conductive.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a sealing arrangement which allows continuous monitoring of the state of the sealing element, wherein the sealing arrangement is easy to install.

In an embodiment, the sealing arrangement comprises at least one sealing element for sealing a gap between a machine element and a housing, wherein the sealing element is at least partially electrically conductive and wherein insulation is provided which electrically insulates the sealing element from the machine element. The contact stress between the elements of the sealing arrangement and the machine element to be sealed changes due to the wear phenomena described above, such as material fatigue, wear and setting behavior. Therefore, the contact stress gradually decreases over the operating time.

The change in the contact stress can be detected by means of sensors. Sensors suitable for this purpose are, for example, pressure sensors or strain gauge elements which transmit an electrical signal to an electronic evaluation system.

In the embodiment according to the invention, the sealing element is at least partially electrically conductive so that the change in the contact stress can be detected directly by the sealing element. The sensor function is thereby integrated directly into the sealing element. It is not necessary to provide a separate sensor. If the contact stress changes during operation due to wear or setting behavior, the electrical properties of the at least partially electrically conductive sealing element change.

According to the invention, the change in the contact stress or the wear behavior of the sealing element is intrinsically detected by means of the electrically conductive equipment. It is therefore necessary to insulate the sealing element from adjacent and electrically conductive elements. In order to achieve this, the sealing element is electrically insulated from the machine element and/or the housing. This ensures that only the electrical properties of the at least partially electrically conductive sealing element are used to determine the wear or to determine the change in the contact stress. An electrically conductive contact between sealing element and machine element or housing would distort the measurement result.

According to a first advantageous embodiment, the sealing element is provided with a cover forming the insulation. In this case, the cover can be formed from a sealing material and come into direct or indirect contact with the machine element. The wear behavior of the sealing element is determined inside the sealing element. Wear of the sealing element and thus the need for replacement is already given if the contact stress of the sealing element falls below a predetermined value. There is no direct contact of the sealing element or of the electrically conductive section of the sealing element with the machine element to be sealed.

According to an alternative embodiment, the housing has an installation space for the sealing element, wherein the installation space is provided with a lining which forms the insulation. The installation space can be embodied, for example, in the form of an annular groove, wherein the side walls and the groove base are provided with the lining. The lining preferably consists of a polymeric material.

Electrical insulation from the machine element can result from either a further insulation or a further sealing element being provided between sealing element and machine element. For example, the sealing arrangement can have a sealing element embodied as an O-ring and a further sealing element in the form of a sleeve. The sealing element is arranged on the outer circumference of the further sealing element and causes the further sealing element to be pressed radially against the machine element. In this embodiment, the further sealing element is activated by the sealing element. Further sealing elements embodied in this way are frequently made of PTFE.

The sealing element is preferably formed from conductive plastic. For this purpose, the sealing element can be provided with electrically conductive particles, for example iron-containing particles or carbon-containing particles. In particular, it is conceivable for the sealing element to be formed from elastomeric material which is provided with electrically conductive particles.

The sealing arrangement can comprise an evaluation unit which detects the electrical resistance of the sealing element, in particular changes due to the so-called piezo resistive effect.

Preferably, the sealing element bears with prestress against the machine element or the further sealing element, wherein the electrical resistance of the sealing element detected by the evaluation unit changes as a function of the prestress. The prestress changes due to the wear behavior described above and decreases gradually.

The electrical resistance of the sealing element detected by the evaluation unit can change as a function of the setting behavior. Furthermore, the electrical resistance may change due to the fact that by changing the stress conditions inside the sealing element, the arrangement of the electrically conductive particles within the sealing element changes, which is accompanied by a change in the electrical resistance. This behavior is comparable to that of a piezoresistive effect.

The sealing element can be provided with electrically conductive contact elements. For this purpose, one or more cables can be introduced into the sealing element or vulcanized into the sealing element. Alternatively, tabs made of electrically conductive material can be formed from the sealing element. In this case, the tabs can be formed from the same material as and integrally with the electrically conductive sections of the sealing element.

The sealing element can have a plurality of electrically conductive segments. To this end, the sealing element can be divided, that is to say subdivided, over its circumference into sectors which are formed separately from one another and are electrically conductive. As a result, the wear of the sealing element can be more accurately determined and located, which is particularly advantageous for large seals. However, the sealing element can also have a multilayer construction over its width so that a progression of the contact stress under a seal can be measured. The multilayer construction of the sealing element can be achieved in that the sealing element is produced by means of a 3D printing process.

The figures show a sealing arrangement 1 for sealing a gap between a machine element 2 and a housing 3. A sealing element 4 arranged between machine element 2 and housing 3 seals the gap. The sealing element 4 is arranged in an installation space 7 introduced into the housing 3. The installation space 7 is in the form of a circumferential groove.

In the present embodiments, the machine element 2 is a rotatably and/or translationally movable machine element 2, for example a shaft.

The sealing element 4 consists of a plastic, here an elastomeric material, and is provided with electrically conductive particles. Known sealing materials come into consideration for seals 4 as the material for the sealing element 4. Natural rubber, EPDM, fluorinated rubber or the like can be used, for example. The electrically conductive particles can, for example, be ferrous particles or carbon particles.

An evaluation unit detects the electrical resistance of the sealing element 4. Suitable evaluation units are known from the prior art.

Figure 1:
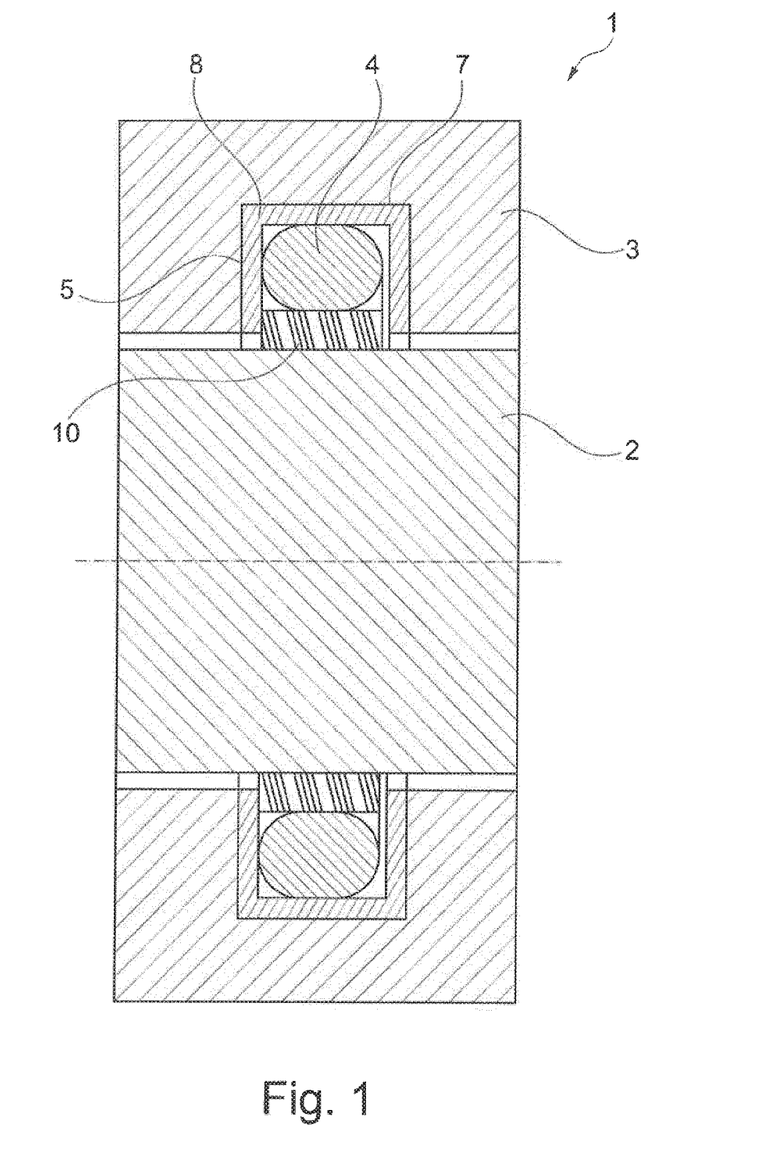
FIG. 1 a sealing arrangement with an insulation associated with the housing.

FIG. 1 shows a sealing arrangement 1 with a first sealing element 4 which presses a further sealing element 10 radially against the machine element 2. The sealing element 4 is designed as an O-ring. The further sealing element 10 is designed as a sleeve. The further sealing element 10 consists of PTFE. The sealing element 4 is electrically insulated from the machine element 2 by the further sealing element 10. The sealing element 4 is accommodated in a groove-shaped installation space 7 of the housing 3. The installation space 7 is provided with a lining 8 of polymeric material, whereby an electrical insulation 5 of the sealing element 4 from the housing 3 results.

Figure 2:
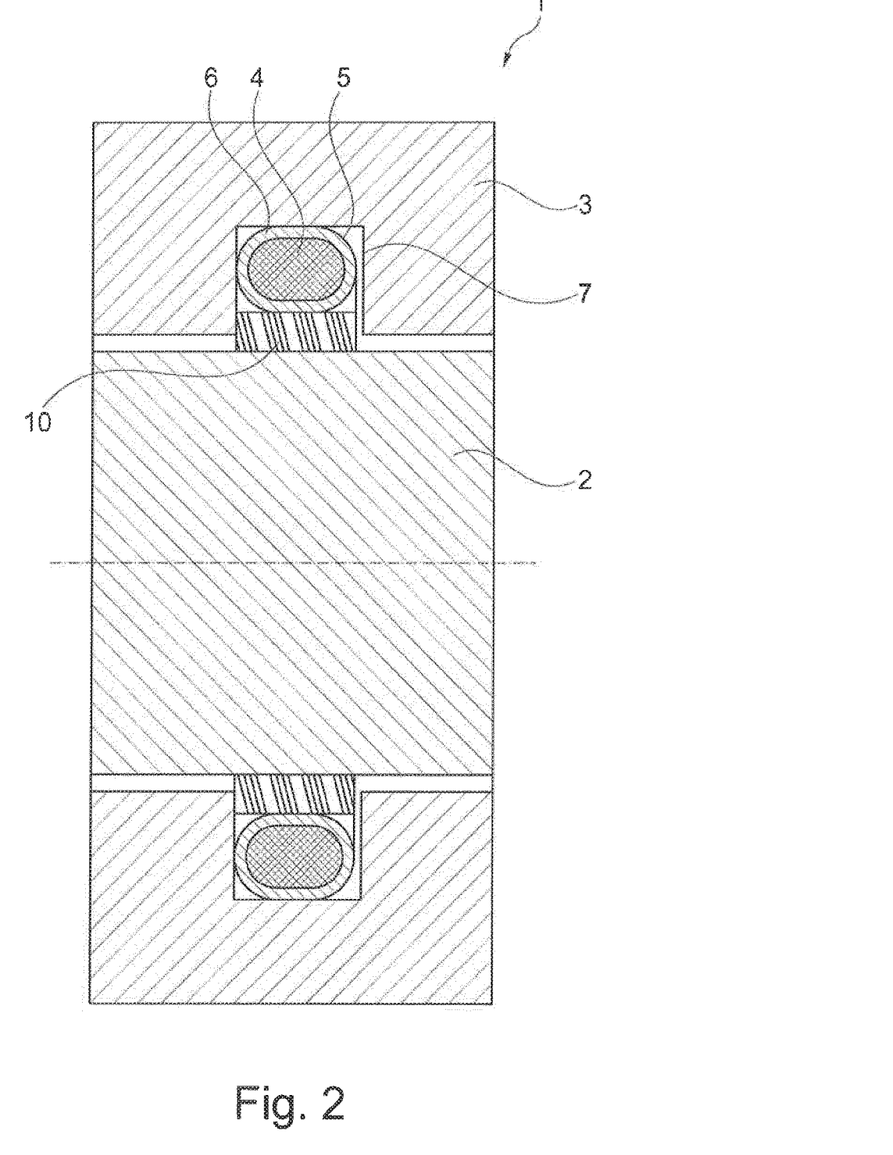
FIG. 2 a sealing arrangement with a cover insulating the sealing element.

FIG. 2 shows a sealing arrangement 1 according to FIG. 1, wherein the insulation 5 is formed by a cover 6 enclosing the sealing element 4. The cover 6 consists of electrically insulating sealing material.

Figure 3:
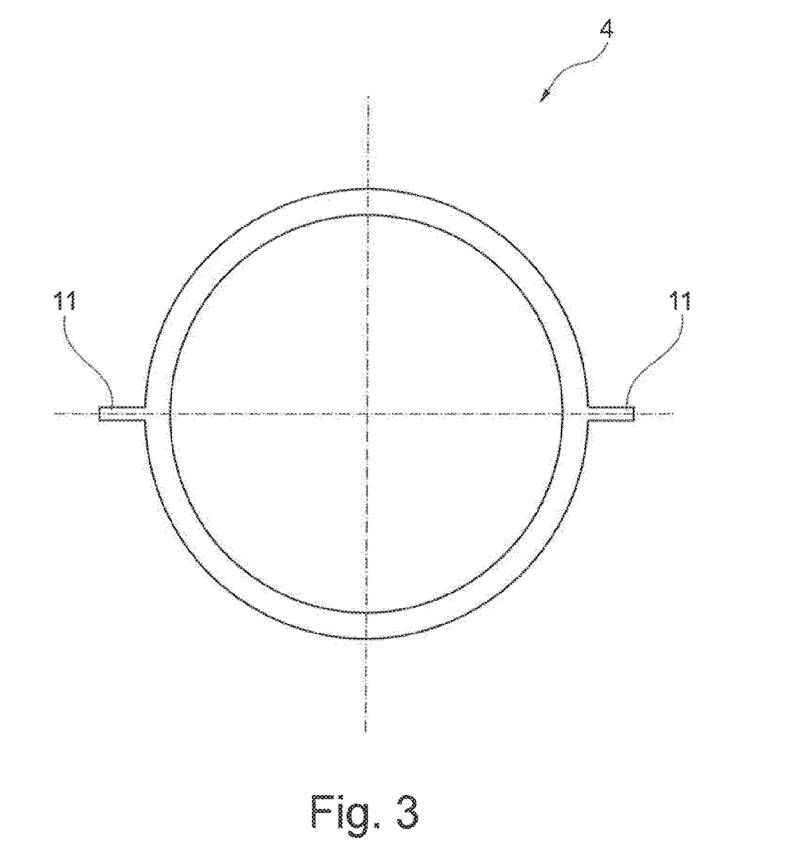
FIG. 3 a sealing element with contact tabs.

FIG. 3 shows a plan view of a sealing element 4 in the form of an O-ring. Contact elements 11 in the form of tabs made of electrically conductive material, which project radially outward, are formed from the sealing element 4. The tabs are formed from the same material as and integrally with the sealing element 4.

Figure 4:
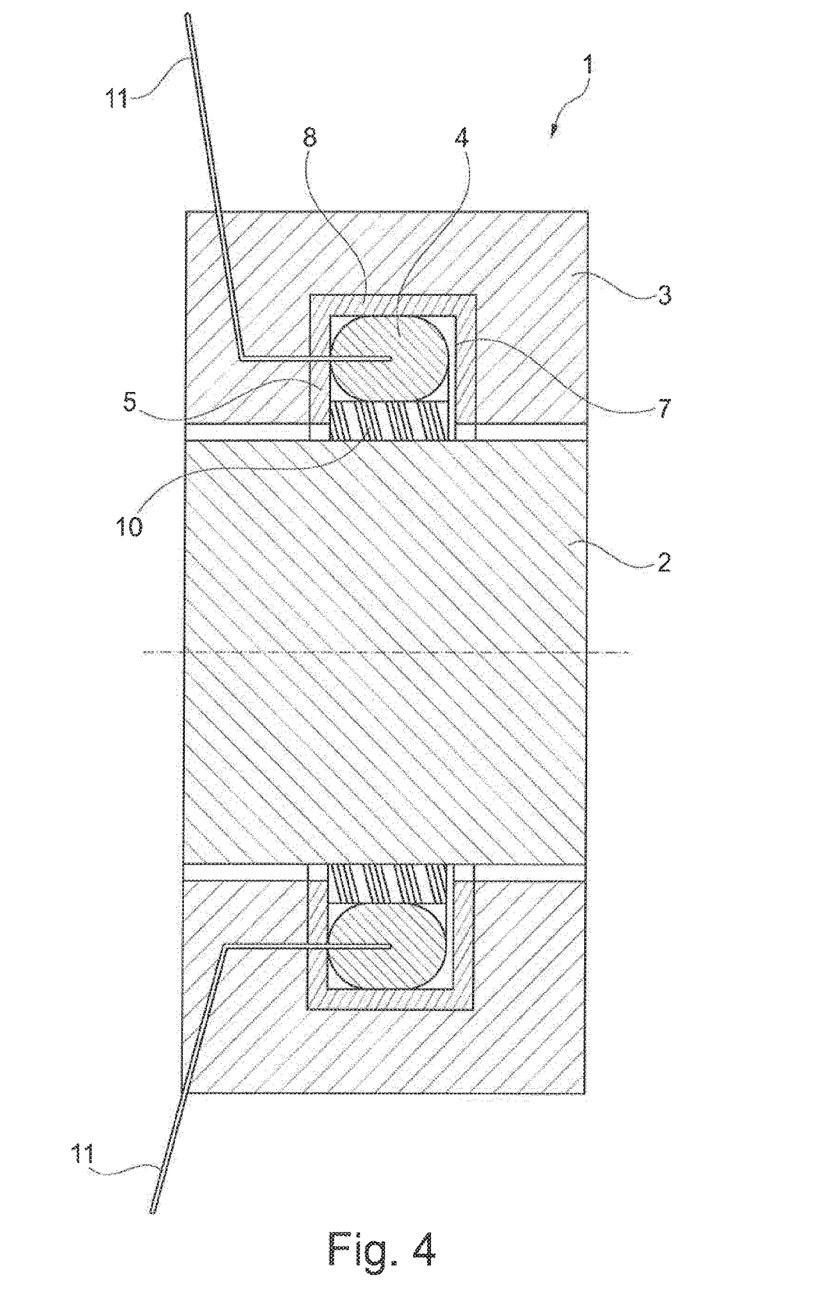
FIG. 4 a sealing element with embedded cables.

FIG. 4 shows a sealing arrangement 1 according to FIG. 1, wherein contact elements 11 are provided in the form of electrical lines or cables which project into the interior of the sealing element 4. The contact elements 11 result in a conductive connection between sealing element 4 and evaluation unit 9. Although the connection is not shown in the sealing arrangements 1 shown in the other figures, it is likewise present.

Figure 5:
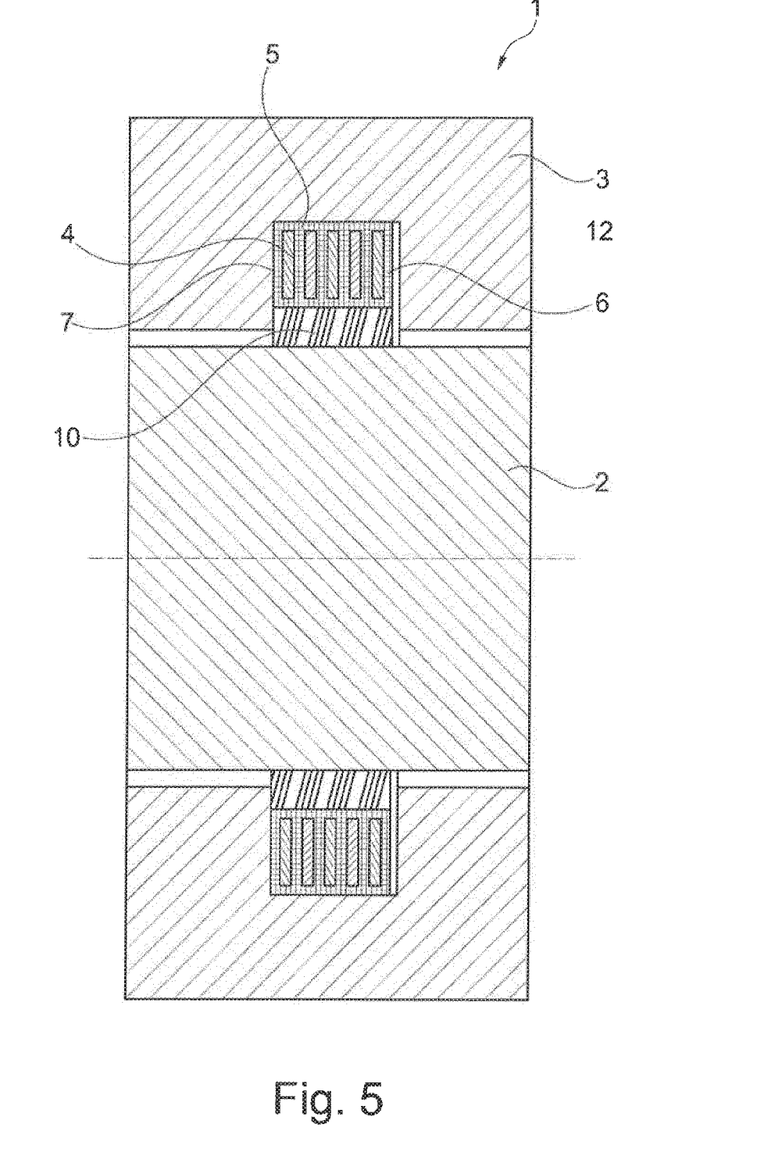
FIG. 5 a multilayer sealing element.

FIG. 5 shows a sealing arrangement 1 in which the sealing element 4 has a multilayer design. The sealing element 4 has segments 12 in the form of a plurality of axially superimposed annular layers which are insulated from one another. Furthermore, the insulation 5 is formed in such a way that a cover 6 enclosing the sealing element 4 is produced.

The individual layers of the segments 12 can be produced by means of a 3D printing method.

Figure 6:
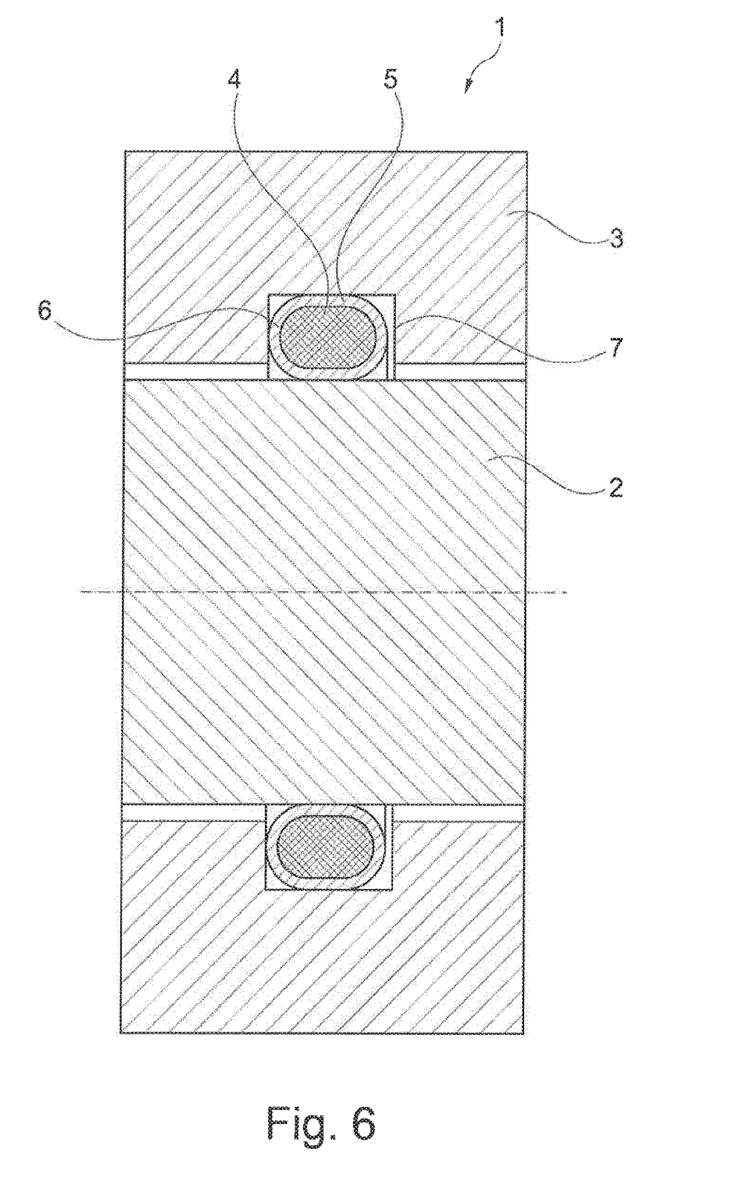
FIG. 6 a static sealing arrangement.

FIG. 6 shows a static seal in which an O-ring is arranged in a housing 3 and seals the gap between the housing 3 and the machine element 2. The sealing element 4 is provided with an electrical insulation 5 in the form of a cover 6 which electrically insulates the sealing element 4 from the housing 3 and the machine element 2.

Figure 7:
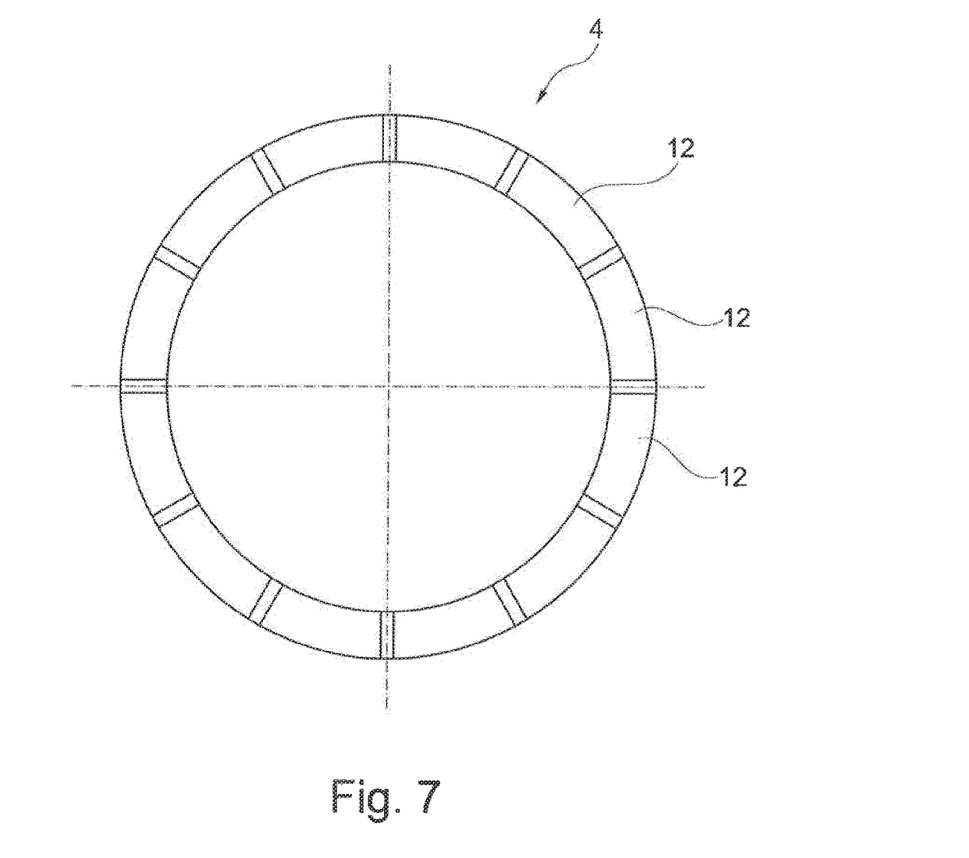
FIG. 7 a sealing element with electrically conductive sectors.

FIG. 7 shows a plan view of a sealing element 4 which has segments 12 in the form of sectors with electrically conductive equipment, which are electrically insulated from one another.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sealing arrangement for sealing a gap between a machine element and a housing, comprising:
   at least one sealing element; and
   an insulation which electrically insulates the at least one sealing element from the machine element and the housing,
   wherein the at least one sealing element is at least partially electrically conductive.

2. The sealing arrangement according to claim 1, wherein the at least one sealing element is provided with a cover forming the insulation.

3. The sealing arrangement according to claim 1, wherein the housing has an installation space for the at least one sealing element, and
   wherein the installation space is provided with a lining which forms the insulation.

4. The sealing arrangement according to claim 1, wherein the at least one sealing element comprises an electrically conductive plastic.

5. The sealing arrangement according to claim 1, wherein the at least one sealing element comprises an electrically conductive elastomeric material.

6. The sealing arrangement according to claim 1, wherein a material of the at least one sealing element is provided with electrically conductive particles.

7. The sealing arrangement according to claim 1, wherein the at least one sealing element comprises an O-ring.

8. The sealing arrangement according to claim 1, further comprising an evaluation unit configured to detect an electrical resistance of the at least one sealing element.

9. The sealing arrangement according to claim 8, wherein the at least one sealing element bears with prestress against the machine element or a further sealing element, and
   wherein the electrical resistance of the at least one sealing element detected by the evaluation unit changes as a function of the prestress.

10. The sealing arrangement according to claim 8, wherein the electrical resistance of the at least one sealing element detected by the evaluation unit changes as a function of a setting behavior.

11. The sealing arrangement according to claim 1, wherein the at least one sealing element is provided with electrically conductive contact elements.

12. The sealing arrangement according to claim 1, wherein the at least one sealing element has a plurality of electrically conductive segments.

* * * * *